US008499903B2

(12) United States Patent
Sakuta et al.

(10) Patent No.: US 8,499,903 B2
(45) Date of Patent: Aug. 6, 2013

(54) SUSPENSION DEVICE

(75) Inventors: Atsushi Sakuta, Tokyo (JP); Takuhiro Kondo, Tokyo (JP); Takayuki Tachi, Toyota (JP)

(73) Assignees: Kayaba Industry Co., Ltd., Minato-ku (JP); Toyota Jidosha Kabushiki Kaisha, Toyota-shi (JP)

( * ) Notice: Subject to any disclaimer, the term of this patent is extended or adjusted under 35 U.S.C. 154(b) by 336 days.

(21) Appl. No.: 12/487,079

(22) Filed: Jun. 18, 2009

(65) Prior Publication Data

US 2009/0321201 A1  Dec. 31, 2009

(30) Foreign Application Priority Data

Jun. 25, 2008  (JP) ................................. 2008-165336

(51) Int. Cl.
*F16D 65/56* (2006.01)

(52) U.S. Cl.
USPC ..................... 188/202; 188/196 V; 267/64.24

(58) Field of Classification Search
USPC .............. 188/322.12, 321.11, 156, 157, 161, 188/162, 164, 202, 196 V; 267/64.19, 64.21, 267/64.23, 64.27, 64.24, 122
See application file for complete search history.

(56) References Cited

U.S. PATENT DOCUMENTS

| 3,191,964 | A | * | 6/1965 | Chambers | .............. 280/124.158 |
|---|---|---|---|---|---|
| 4,844,429 | A | * | 7/1989 | Ecktman | .................... 267/64.24 |
| 5,060,959 | A | * | 10/1991 | Davis et al. | ................ 280/5.514 |
| 5,678,847 | A | * | 10/1997 | Izawa et al. | ................ 280/5.515 |
| 5,961,106 | A | * | 10/1999 | Shaffer | .......................... 267/221 |
| 7,722,056 | B2 | * | 5/2010 | Inoue et al. | ................ 280/5.512 |
| 2004/0150361 | A1 | * | 8/2004 | Hio et al. | ....................... 318/375 |
| 2005/0051988 | A1 | * | 3/2005 | Gradu et al. | ........... 280/124.134 |
| 2008/0164111 | A1 | * | 7/2008 | Inoue et al. | .................... 188/297 |

FOREIGN PATENT DOCUMENTS

| JP | 61016115 A | * | 1/1986 |
|---|---|---|---|
| JP | H07-22144 U | | 4/1995 |
| JP | 2007-292255 | | 11/2007 |
| JP | 2008-95799 A | | 4/2008 |
| JP | 2008-95800 | | 4/2008 |
| JP | 2008-95801 A | | 4/2008 |
| WO | WO 2006057190 A1 | * | 6/2006 |
| WO | WO 2006112244 A1 | * | 10/2006 |

* cited by examiner

*Primary Examiner* — Xuan Lan Nguyen
(74) *Attorney, Agent, or Firm* — McGlew and Tuttle, P.C.

(57) ABSTRACT

In a suspension device (S) comprising a motion transforming mechanism (T) for transforming a linear motion of a linear motion member (1) into a rotational motion of a rotating member (2) and a motor (M) connected to the rotating member (2) in the motion transforming mechanism (T), an air spring (AS) is provided, the air spring (AS) including a tubular air chamber (22) connected to the motor (M), an air piston (37) connected to the linear motion member (1) and being tubular and smaller in diameter than the air chamber (22), and a diaphragm (27) interposed between the air chamber (22) and the air piston (37), a stopper (38a) is provided on an outer periphery of the air piston (37), and a stopper seat (46) is provided on an inner periphery of the air chamber (22) so as to be put in abutment against the stopper (38a) upon maximum extension of the suspension device involving relative separation of the air chamber (22) and the air piston (37) with respect to each other.

17 Claims, 1 Drawing Sheet

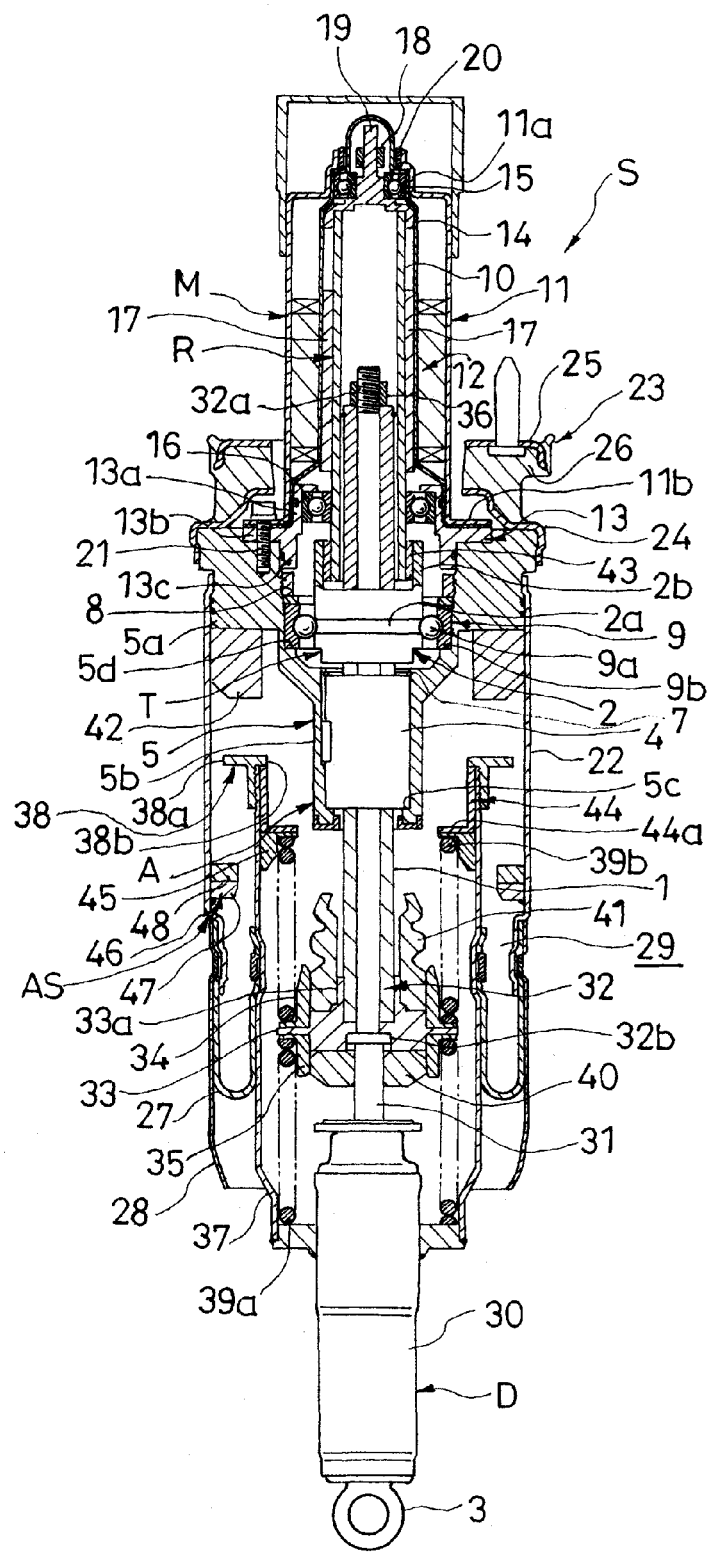

SUSPENSION DEVICE

FIELD OF ART

The present invention relates to an improvement of a suspension device for suppressing a relative movement between a vehicle body and an axle with use of an electromagnetic force developed in a motor.

BACKGROUND ART

As a suspension device of this type, there is known such a suspension device as is disclosed in Japanese Patent Laid-Open Publication No. 2007-292255. This conventional suspension device is composed of an actuator, the actuator having a screw shaft threadably engaged with a ball screw nut rotatably and a motor connected to one end of the screw shaft and fixed to a vehicle body, and a hydraulic damper interposed between an axle and the ball screw nut in the actuator to suppress the transfer of a high-frequency vibration to the vehicle body. A relative movement between the vehicle body and the axle is controlled actively with thrust of the actuator.

DISCLOSURE OF THE INVENTION

In the case of the suspension device disclosed in Japanese Patent Laid-Open Publication No. 2007-292255, as referred to above, since the actuator and the hydraulic damper are adapted to extend and retract each independently, a stopper or the like is used to restrict a maximum extension and a maximum retraction of each of the actuator and the hydraulic damper.

In the conventional suspension device, therefore, it is not until a further extension beyond the maximum extension is inhibited with respect to each of the actuator and the hydraulic damper that a maximum extension of the entire device is restricted.

Thus, the whole of the suspension device may become too long upon maximum extension of both actuator and hydraulic damper. Accordingly, it is necessary to adopt measures for restricting a maximum extension length of the entire suspension device. For example, the present applicant has already proposed such measures in Japanese Patent Application No. 2006-277517 (Laid-Open Publication No. 2008-95800). According to the proposed measures, a spring seat functioning as a stopper is provided on an outer periphery of a hydraulic damper and a sealing case functioning as a stopper seat is provided at a lower end of a tubular member connected to a motor, and the spring seat and the sealing case are brought into abutment against each other upon maximum extension of the suspension device concerned to restrict a maximum extension length.

The suspension device disclosed in the above patent Laid-open Publication No. 2008-95800 is provided on an outer periphery thereof with an air spring functioning as a suspension spring. Since the aforesaid tubular member is installed for the purpose of restricting the maximum extension length of the suspension device and disposing a sealing member on the outer periphery of the hydraulic damper, it is designed to be long, having a diameter permitting its insertion between an air piston and the hydraulic damper, and hence heavy. Besides, abutment between the spring seat and the sealing case is to be effected and there is adopted a triple tube structure including the tubular member, the air piston and an outermost air chamber, thus requiring clearances for avoiding interferences among those components. Consequently, there is a fear of the suspension device becoming larger in its outside diameter.

The present invention has been accomplished in view of the above-mentioned inconveniences and an object thereof is to provide a suspension device which is lightweight and permits reduction in radial size.

According to the present invention, for achieving the above-mentioned object, there is provided a suspension device comprising a motion transforming mechanism for transforming a linear motion of a linear motion member into a rotational motion of a rotating member and a motor connected to the rotating member in the motion transforming mechanism, characterized in that an air spring is provided, the air spring including a tubular air chamber connected to the motor, an air piston connected to the linear motion member and being tubular and smaller in diameter than the air chamber, and a diaphragm interposed between the air chamber and the air piston, a stopper is provided on an outer periphery of the air piston, and a stopper seat is provided on an inner periphery of the air chamber so as to be put in abutment against the stopper upon maximum extension of the suspension device involving relative separation of the air chamber and the air piston with respect to each other.

According to the suspension device of the present invention, since a stopper is provided on the outer periphery of the air piston and a stopper seat for abutment against the stopper upon maximum extension of the suspension device is provided on the inner periphery of the air chamber, such a tubular member having a member for abutment against a stopper as in the prior art is not required to be installed on the motor side, and hence, the weight of the suspension device can be so much reduced. Moreover, since it is not necessary to install tubes for restricting a maximum extension length, it is not required to ensure clearances that are needed in case of installing the tubes. Consequently, it is possible to reduce the outside diameter of the suspension device.

BRIEF DESCRIPTION OF THE DRAWING

FIG. 1 is a longitudinal sectional view of a suspension device according to an embodiment of the present invention.

BEST MODE FOR CARRYING OUT THE INVENTION

The present invention will now be described on the basis of an embodiment thereof illustrated in the drawing. As shown in FIG. 1, a suspension device S according to an embodiment of the present invention basically comprises an actuator A, the actuator A including a motion transforming mechanism T for transforming a linear motion of a screw shaft 1 as a linear motion member into a rotational motion of a ball screw nut 2 as a rotating member and a motor M connected to the ball screw nut 2 in the motion transforming mechanism T; an air spring AS, the air spring AS including a tubular air chamber 22 connected to the motor M, an air piston 37 connected to the linear motion member 1 and being tubular and smaller in diameter than the air chamber 22, and a diaphragm 27 interposed between the air chamber 22 and the air piston 37; a stopper 38a provided on an outer periphery of the air piston 37; and a stopper seat 46 provided on an inner periphery of the air chamber 22 and adapted to come into abutment against the stopper 38a upon maximum extension of the suspension device involving relative separation of the air chamber 22 and the air piston 37 from each other.

The suspension device S further comprises a hydraulic damper D connected to the screw shaft 1 as a linear motion member and the air spring AS interposed between the actuator A and the hydraulic damper D. The suspension device S is attached to a sprung member of a vehicle (not shown) through a mount 23 provided on an outer periphery of the actuator A and is attached also to an unsprung member of the vehicle (not shown) through an eye bracket 3 provided at a lower end in FIG. 1 of the hydraulic damper D. Thus, the suspension device S can be interposed between the sprung member and the unsprung member of the vehicle.

In the suspension device S, the ball screw nut 2 is driven to rotate with torque generated by the motor M, thereby making the screw shaft 1 perform a linear motion vertically in FIG. 1. Thus, the suspension device S can function as an actuator.

When the screw shaft 1 is forced to perform a linear motion with an external force, a rotor R of the motor M connected to the ball screw nut 2 performs a rotational motion and the motor M produces torque for suppressing the rotational motion of the rotor R caused by an induced electromotive force, functioning to suppress the linear motion of the screw shaft 1. In this case, the vertical linear motion in FIG. 1 of the screw shaft 1 as a linear motion-side member is suppressed with regenerated torque which the motor M produces by regenerating and converting kinetic energy inputted externally into electrical energy.

That is, according to the suspension device S, thrust can be imparted to the screw shaft 1 by allowing the motor M to produce torque positively, and when the screw shaft 1 is moved forcibly by an external force, the liner motion of the screw shaft 1 can be suppressed with the regenerated torque produced by the motor M.

Thus, since the suspension device S not only generates a damping force for suppressing the linear motion of the screw shaft 1 but also functions as an actuator, when the suspension device S is used in an interposed state between the vehicle body and an axle, an attitude control for the vehicle body can also be done simultaneously, whereby the suspension device S can function as an active suspension.

In the suspension device S, as described above, the hydraulic damper D is connected in series with the screw shaft 1 of the actuator A which is connected to the sprung member, the hydraulic damper D being provided mainly for the purpose of absorbing a high-frequency vibration. More specifically, the hydraulic damper D is connected in series with the actuator A which is large in the moment of inertia and difficult to extend or retract against the input of a high-frequency vibration, thus permitting easy transfer of vibration, and thereby absorbs the energy of a high-frequency vibration such as vibration of a relatively large acceleration upon input of the vibration.

Thus, upon input of not only a low-frequency vibration but also a high-frequency vibration caused by striking on a road-surface projection, the suspension device S can suppress the vibration effectively and hence can improve ride comfort in the vehicle.

According to the construction described above, the actuator A provided with the motor M is attached to the sprung member, while the hydraulic damper D is attached to the unsprung member. With the hydraulic damper D, a high-frequency vibration is difficult to be transmitted to the actuator A, thus permitting protection of the motor M as a drive source of the actuator A against vibration. However, when only the transfer of a high-frequency vibration to the sprung member is to be taken into account, the actuator A may be attached to the unsprung member and the hydraulic damper D attached to the sprung member. Although the suspension device S is provided with the hydraulic damper D, the actuator A alone may be used without using the hydraulic damper D. As noted above, since the suspension device S can function not only as an actuator but also as a damper, there also may be adopted a construction in which the hydraulic damper D is omitted.

In this embodiment, the motion transforming mechanism T includes the screw shaft 1 as a linear motion member and the ball screw nut 2 as a rotating member. Conversely, there may be adopted a construction in which the rotor R of the motor M is connected to the screw shaft 1, using the screw shaft 1 as a rotating member and the ball screw nut 2 as a linear motion member, and the ball screw nut 2 is connected with use of a tube or the like to an object to be damped. Further, there also may be adopted any other mechanism, e.g., rack and pinion, than the combination of the screw shaft 1 and the ball screw nut 2 as long as the mechanism can be actuated not only from the motor M side but also by an external input and is not an irreversible mechanism.

A detailed description will now be given about a concrete construction of each of the components of the suspension device S. As shown in FIG. 1, the screw shaft 1 is formed in a cylindrical shape and with a spiral screw groove (not shown) formed on an outer periphery of the screw shaft. Further, a linear spline groove (not shown) is formed along the axis of the screw shaft 1, namely, in the direction of the linear motion of the screw shaft 1. To prevent the screw shaft 1 from coming off a ball spline nut 4 which will be described later, the spline groove may not be formed at a terminal end of the screw shaft 1. The number of the spline groove may be arbitrary.

On the other hand, the ball screw nut 2 is not illustrated in detail since it is well known. For example, the ball screw nut 2 includes a spiral passage opposed to the screw groove of the screw shaft 1 formed in an inner periphery of a tubular body, a circulation passage formed within the tubular body and providing communication between both ends of the spiral passage, plural balls accommodated within the spiral passage and the circulation passage and adapted to travel along the screw groove, and spacers each interposed between adjacent such balls. Each ball can circulate through the spiral passage and the circulation passage both formed in a loop shape. Although the screw nut used in this embodiment is the ball screw nut 2 to attain a smooth linear motion of the screw shaft 1, there may be used a mere nut having screw threads for fitting in the screw groove of the screw shaft 1 as long as the mechanism concerned is not an irreversible mechanism as noted above. An annular groove 2a is formed in an outer periphery of the ball screw nut 2. Further, a tubular socket 2b is provided at an upper end in FIG. 1 of the ball screw nut 2.

For allowing the screw shaft 1 to perform a linear motion with rotation of the ball screw nut 2, it is necessary to provide a mechanism for inhibiting rotation of the screw shaft 1. In this embodiment, the spline groove formed in the outer periphery of the screw shaft 1 and the ball spline nut 4 constitute the rotation inhibiting mechanism.

The ball spline nut 4 is not illustrated in detail since it is well known, but for example it includes a rectilinear passage formed in an inner periphery of a tubular body and opposed to the spline groove formed in the outer periphery of the screw shaft 1, a circulation passage formed within the tubular body and providing communication between both ends of the rectilinear passage, plural balls accommodated within the rectilinear passage and the circulation passage and adapted to travel along the spline groove, and spacers each interposed between adjacent such balls. Each ball can circulate along the rectilinear passage and the circulation passage both formed in a loop shape.

The ball screw nut 2 is brought into threaded engagement with the screw shaft 1 along the screw groove and the ball spline nut 4 is fitted on the screw shaft 1 along the spline groove.

The ball screw nut 2 and the ball spline nut 4 are held by an inner periphery of a tubular holder 5 with the ball screw nut 2 located at an upper position in FIG. 1.

The holder 5, formed in a tubular shape, includes an upper side formed as a large-diameter portion 5*a* and a lower side formed as a small-diameter portion 5*b* both in FIG. 1. The holder 5 holds unrotatably the ball spline nut 4 which is accommodated within the small-diameter portion 5*b* and holds rotatably the ball screw nut 2 which is accommodated within the large-diameter portion 5*a* through a ball bearing 9. As to a mechanism for inhibiting rotation of the ball spline nut 4 with respect to the holder 5, it is not shown, but there may be adopted a known rotation inhibiting mechanism, for example, using a key or forming the outer periphery of the ball spline nut 4 matching the inner periphery shape of the small-diameter portion 5*b* into any other shape of the circular shape.

The ball spline nut 4 is held grippingly by both a snap ring 7, the snap ring 7 being in abutment against an upper end in FIG. 1 of the ball spline nut 4 and attached to an inner periphery of an upper end in FIG. 1 of the small-diameter portion 5*b* of the holder 5, and a flange 5*c* formed on an inner periphery of a lower end in FIG. 1 of the small-diameter portion 5*b* of the holder 5. Thus, the ball spline nut 4 is prevented from coming off the holder 5.

The ball screw nut 2 is held grippingly by both a stepped portion 5*d* formed in the inner periphery of the holder 5 and a nut 8 threadably engaged with the inner periphery of the holder 5, and is held rotatably by the holder through the ball bearing 9 which is fixed to the inner periphery of the holder 5. Balls 9*a* of the ball bearing 9 are adapted to travel along the annular groove 2*a* formed in the outer periphery of the ball screw nut 2. The ball screw nut 2 itself functions as an inner ring of the ball bearing 9, and by fixing an outer ring 9*b* of the ball bearing 9 to the holder 5, the ball screw nut 2 can be fixed to the holder 5. The ball screw nut 2 and the ball spline nut 4 are disposed close to each other while being held by the holder 5.

The motion transforming mechanism T comprising the ball screw nut 2 and the screw shaft 1 is held by the holder 5 in a rotation-inhibited state of the screw shaft 1 and is in an assembled form. When the ball screw nut 2 performs a rotational motion, the screw shaft 1 is inhibited its rotation by the ball spline nut 4 and thereby performs a linear motion vertically in FIG. 1.

In this embodiment, as noted above, the ball screw nut and the screw shaft 1 in the motion transforming mechanism T, as well as the ball spline nut 4 as a mechanism for inhibiting rotation of the screw shaft 1, are held by a single holder 5, whereby they are assembled in an aligned state of both screw shaft 1 and ball screw nut 2. Therefore, the operation of the motion transforming mechanism T is ensured.

Thus, a shaft 10 of the motor M to be described later, as well as the screw shaft 1 and the ball screw nut 2, are aligned with one another by the holder 5. Besides, the motor M is fixed to the holder 5. Therefore, a load is imposed neither on the screw groove of the screw shaft 1 nor on the balls as screw threads of the ball screw nut 2, and a radial unbalanced load is not imposed on the shaft 10 of the motor M. Consequently, the life of the actuator A is not shortened nor is deteriorated the durability of the suspension device S.

Besides, since the shaft 10 of the motor M, the screw shaft 1 and the ball screw nut 2 are brought into alignment with one another by the holder 5, an aligning work for the screw shaft 1 and the ball screw nut 2 is not needed at the time of installation to a vehicle, with the result that the mounting work for a vehicle becomes far easier than in the conventional suspension device.

Moreover, since the screw shaft 1 and the ball screw nut 2 are assembled by the holder 5 and the assembly of the actuator A is completed by connecting the motor M to the shaft-nut assembly, the assembling work at the actuator A portion in the suspension device S becomes easier.

More particularly, when there is adopted a construction in which a rotating member in the motion transforming mechanism T, i.e., the ball screw nut 2, is not held by the holder 5, but is built in the motor M side, it is necessary to perform a work of rotating the ball screw nut 2 to pull the screw shaft 1 into the motor M at the time of connection between the motor M and the motion transforming mechanism T. Such a work is no longer required by holding the whole of the motion transforming mechanism T integrally with the holder 5. When there is adopted a construction in which the ball screw nut 2, the screw shaft 1 and the ball spline nut 4 are held with separate holders respectively, even without installing of the ball screw nut 2 into the motor M, there arises the necessity of giving consideration also to the inhibition of rotation of the holders. In this embodiment, there is provided an advantage that such a consideration is not needed.

According to the above construction, the ball spline nut 4 which engages the spline groove formed in the outer periphery of the screw shaft 1 is used as the rotation inhibiting mechanism since a smooth vertical movement of the screw shaft 1 can be effected. However, a mere groove may be formed in the outer periphery of the screw shaft 1 along the axis of the screw shaft and a member not impeding the vertical movement of the screw shaft 1, e.g., a key, may be fitted in the groove to inhibit rotation of the screw shaft 1. Such construction may be adopted since the rotation inhibiting mechanism can be held by the holder 5.

Although a description has been given above about the advantages of holding the ball screw nut 2, the screw shaft 1 and the ball spline nut 4 by a single holder 5, there also may be adopted a construction in which the ball screw nut 2, the screw shaft 1 and the ball spline nut 4 are held by separate holders respectively.

By disposing the ball screw nut 2 used for axial movement of the screw shaft 1 and the ball spline nut 4 as a component of the mechanism for inhibiting rotation of the screw shaft 1 close to each other, it is possible to shorten the length of the screw shaft 1 which is positioned in the section between the ball screw nut 2 and the ball spline nut 4.

The portion positioned in the above section of the screw shaft 1 is a twisted portion with rotation of the ball screw nut 2, and the shorter the section, the shorter the twisted portion.

The screw shaft 1 twisted functions also as a spring element and therefore, the longer the twisting section, the longer time is taken for response of the linear motion of the screw shaft 1 to the rotation of the ball screw nut 2. As noted above, since the twisting section of the screw shaft 1 can be shortened by disposing the ball screw nut 2 and the ball spline nut 4 close to each other, the responsiveness of the suspension device S when functioning as an actuator is improved.

Since the responsiveness of the suspension device S when functioning as an actuator is thus improved, the controllability in case of controlling the vehicle attitude actively is also improved.

On the other hand, as shown in FIG. 1, the motor M includes a tubular casing 11 provided at an upper end thereof with a small-diameter portion 11*a*, a stator 12 composed of a core fixed to an inner periphery of the casing 11 and a coil wound round the core, an annular cap 13 fitted in a lower-end opening in FIG. 1 of the casing 11, a topped tubular partition wall 14 fitted in both small-diameter portion 11a of the casing 11 and inner periphery of the cap 13, and a rotor R which is held rotatably by the casing 11 through a ball bearing 15 fitted in an upper-end inner periphery in FIG. 1 of the partition wall 14 and a ball bearing 16 fitted in the inner periphery of the cap 13.

The cap 13 includes a tubular portion 13a fitted in the inner periphery of the casing 11, a flange 13b provided on an outer periphery of the tubular portion 13a and abutted against a flange 11b provided on an outer periphery of the lower end in FIG. 1 of the casing 11, and a tubular fitting portion 13c suspended from the tubular portion 13a and fitted in an upper-end inner periphery of the holder 5. The partition wall 14 is constructed of a nonmagnetic material and has a top portion smaller in diameter, partitioning the interior of the casing 11 into the rotor R and the stator 12 in an airtight manner.

The rotor R includes the tubular shaft 10 and a magnet 17 which is attached to an outer periphery of an intermediate portion of the shaft 10 so as to confront the stator 12. The rotor R is rotatable with respect to the partition wall 14. An upper end of the shaft 10 is journaled in the ball bearing 15 and is supported by a shaft member 19 which holds a resolver core 18 at its upper-end outer periphery in FIG. 1. An opposite end of the shaft 10 is journaled in an inner periphery of the ball bearing 16 and is fitted in an inner periphery of the socket 2b provided at an upper end of the ball screw nut 2, whereby the shaft 10 of the motor M and the ball screw nut 2 are connected with each other.

A resolver stator 20, which is opposed to the resolver core 18, is attached to an inner periphery of the small-diameter portion 11a of the casing 11. The resolver core 18 and the resolver stator 20 constitute a sensor for detecting a rotational position of the rotor R. With a controller (not shown) for controlling the supply of an electric current to the stator 12, the motor M can be controlled on the basis of a rotational position and a rotational speed of the rotor R. As means for detecting a rotational position of the rotor R, no limitation is made to the above resolver, but for example a magnetic sensor such as a Hall element may be used. Further, since the partition wall 14 is provided in this embodiment, the resolver stator 20 may be attached to an outer periphery of the top of the partition wall 14.

The magnet 17 is formed by bonding plural magnets in an annular shape so that N and S poles appear alternately along the circumference. However, there may be used an annular magnet having such divided pole patterns as N and S poles appearing alternately along the circumference.

Although a brushless motor is used as the motor M in this embodiment, any of various other types of motors may be used as the motor M, including DC motor, AC motor, induction motor, and synchronous motor.

The motor M thus constructed is clamped to the upper end in FIG. 1 of the holder 5 with a bolt 21. More specifically, the bolt 21, which extends through both flange 11b of the casing 11 and flange 13b of the cap 13, is brought into threaded engagement with a tapped hole (not shown) formed as a thick-walled hole in the large-diameter portion 5a of the holder 5, whereby the motor M is fixed to the upper end of the holder 5.

In making the motor M and the holder 5 integral with each other, as described above, a lower end of the shaft 10 is fitted in an inner periphery of the socket 2b of the ball screw nut 2, whereby the shaft 10 of the motor M and the ball screw nut 2 are connected with each other. In this state, the screw shaft 1 can be allowed to perform a linear motion vertically in FIG. 1 by rotating the ball screw nut 2 with the motor M. Thus, once the motor M is fixed to the holder 5, the motor M and the motion transforming mechanism T are connected with each other and the actuator A can be assembled.

A tolerance ring 43 is interposed between the outer periphery of the shaft 10 and the inner periphery of the socket 2b. The tolerance ring 43 functions as a torque limiter for limiting an upper limit of relative rotation torque about an axis acting on both shaft 10 and ball screw nut 2.

More particularly, the tolerance ring 43 is formed by an annular corrugated plate. When the tolerance ring 43 is interposed between the shaft 10 and the socket 2b, the waves of the plate are compressed radially, so that an urging force as a repulsive force is generated, and in accordance with the urging force, a frictional force resisting to the relative rotation between the shaft 10 and the socket 2b is developed between the tolerance ring 43 and the shaft 10, as well as the socket 2b. The shaft 10 and the ball screw nut 2 do not relatively rotate integrally until the relative torque which induces the relative rotation becomes larger than the frictional force. Once the relative torque becomes larger than the frictional force, the shaft 10 and the ball screw nut 2 create a relative rotation. Such a function permits the tolerance ring 43 to function as a torque limiter.

Thus, according to the suspension device S of this embodiment, a relative vibration between the sprung member and the unsprung member in the vehicle is suppressed. Upon input of such an external force as causes the suspension device S to extend or retract rapidly, a linear motion acceleration of the screw shaft 1 is large and the torque for rotating the ball screw nut 2 becomes very large. As a result, the relative torque which causes a relative rotation between the shaft 10 and the ball screw nut 2 becomes larger than the frictional force induced by the urging force of the tolerance ring 43, and the ball screw nut 2 slips and races with respect to the shaft 10. As a result, the shaft 10 fails to rotate, while the ball screw nut 2 alone rotates, and the transfer of torque generated in the motor M on the basis of moment of inertia or an electromagnetic force to the ball screw nut 2 is suppressed.

Therefore, under the above condition, that is, when the speed of stroke of the suspension device S varies widely, the transfer of torque generated in the motor M to the ball screw nut 2 is suppressed and a larger torque than the relative torque tolerated in accordance with the urging force of the tolerance ring 43 is not exerted on the ball screw nut 2, so that it is possible to relieve the influence of inertia moment of the motor M and prevent a damping force developed in the suspension device S from becoming excessive. Consequently, the transfer of a sudden vibration inputted to the unsprung member to the sprung member is suppressed.

Although the tolerance ring 43 is used as a torque limiter in the above description, it may be substituted by a friction member interposed between the shaft 10 and the socket 2b to create a frictional force in both shaft and socket. As the friction member, there may be employed, for example, annular rubber or an annular plate having a rough surface.

In connection with setting of the relative torque which is adjusted by the tolerance ring 43 or the friction member, the relative torque can be adjusted arbitrarily in accordance with an object to be damped to which the suspension device S is applied, but may be set to a value obtained empirically or experientially so that the influence of inertia moment created upon passing a projection or recess formed on a road surface can be relieved.

Thus, according to the suspension device S of this embodiment, it is possible to relieve the influence of inertia moment such that the inertia moment of the motor M is superimposed on the torque caused by the electromagnetic force of the motor M, resulting in the generated damping force becoming too large. Therefore, it becomes possible to improve the ride comfort in the vehicle.

In other word, a larger torque than a tolerated relative torque does not act on the ball screw nut 2, and hence, there is no fear of the motion transforming mechanism T being damaged by the action of excessive torque. Besides, the effect of a large angular acceleration on the rotor R of the motor M is suppressed, thus making it possible to prevent scattering of the magnet 17 fixed around the rotor R and to lighten the load on the motor M, whereby the reliability of the suspension device S is improved.

Further, according to the suspension device S of this embodiment, since the tolerance ring 43 as a torque limiter is interposed between the tubular shaft 10 of the motor M and the fitting portion of the ball screw nut 2 fitting with the socket 2b, the influence on the overall length of the suspension device S is slight and the torque limiter is disposed at a position not exerting an influence on the stroke length, thus making it easy to ensure the stroke length.

In this embodiment, the shaft 10 and the ball screw nut 2 are connected with each other through the tolerance ring 43, but if it is not necessary to provide the torque limiter, the ball screw nut 2 may be attached directly to the shaft 10 of the rotor R, or the ball screw nut 2 itself may be made a shaft of the rotor R of the motor M and the magnet 17 may be attached to the outer periphery of the ball screw nut 2.

The following description is now provided about the hydraulic damper D connected to the screw shaft 1. The hydraulic damper D, which is not illustrated in detail since it is well known, includes a cylinder 30, a piston (not shown) inserted slidably into the cylinder 30 and defining within the cylinder 30 two pressure chambers (not shown) filled with liquid, a rod 31 having one end connected to the piston and projecting from the cylinder 30, a gas chamber or a reservoir (neither shown) formed within the cylinder 30 to compensate a rod volume advancing or retreating with respect to the cylinder 30, and an eye bracket 3 which permits connection of the cylinder 30 to the unsprung member of the vehicle. The hydraulic damper D, when extended or retracted, generates a predetermined damping force.

The hydraulic damper D may be a so-called single tube type provided with a gas chamber within the cylinder 30 or a so-called double tube type provided with an annular reservoir. However, by making the hydraulic damper D a double tube type, there is provided an advantage that it is possible to shorten the overall length of the hydraulic damper D and thereby shorten the overall length of the suspension device S. In the case where the working fluid in the hydraulic damper D is gas and the gas, instead of liquid, is charged into the pressure chambers, the installation of a gas chamber or a reservoir is not needed if the rod volume advancing or retreating with respect to the cylinder 30 in accordance with a change in volume of the gas can be compensated.

An annular cushion 40 is provided on an outer periphery of an upper end of the rod 31. Upon maximum retraction of the hydraulic damper D, the cushion 40 comes into abutment against an upper end in FIG. 1 of the cylinder 30 to cushion a shock created upon the maximum retraction.

In the suspension device S of this embodiment, a connecting shaft 32 extends from the upper end of the rod 31 of the hydraulic damper D and the hydraulic damper D is connected to the screw shaft 1 through the connecting shaft 32. Although the rod 31 and the connecting shaft 32 are formed integrally in this embodiment, both may be formed as separate members and then connected together. Although the rod 31 is connected to the screw shaft 1 through the connecting shaft 32 in this embodiment, the hydraulic damper D may be made an inverted type and the cylinder 30 may be connected to the screw shaft 1 through the connecting shaft 32.

The connecting shaft 32 has a threaded portion 32a at its tip corresponding to an upper end in FIG. 1 and a larger-diameter portion 32b formed at a lower end thereof. An annular disc 33 is mounted on an outer periphery of the lower end in FIG. 1 of the connecting shaft 32. A downward movement of the annular disc 33 is inhibited by the larger-diameter portion 32b. Annular spring seats 34 and 35 are mounted in upper and lower positions respectively on an outer periphery of the disc 33. A socket 33a which permits insertion of the screw shaft 1 therein is provided at an upper end of the disc 33 and an annular bump cushion 41 is fitted on an outer periphery of the socket 33a. A downward movement of the bump cushion 41 is inhibited by the disc 33. Upon maximum retraction of the actuator A, the bump cushion 41 comes into abutment against the lower end of the holder 5 to restrict a maximum retraction stroke length of the actuator A.

Until a lower end of the screw shaft 1 inserted into the socket 33a comes into abutment against an upper surface of the disc 33, the connecting shaft 32 is inserted into the screw shaft 1, and by bringing a nut 36 into threaded engagement with the threaded portion 32a at the upper end of the connecting shaft 32, the screw shaft 1 is sandwiched in between the nut 36 and the disc 33 whose downward movement is inhibited by the larger-diameter portion 32b, and the connecting shaft 32 is connected to the screw shaft 1. In this case, by holding grippingly the screw shaft 1 together with the disc 33 with use of the larger-diameter portion 32b and the nut 36, the connecting shaft 32 is connected to the screw shaft 1. The connecting shaft 32 can be connected from the upper side to the screw shaft 1.

That is, in the assembling work of making the hydraulic damper D and the actuator A integral with each other, it is not that the connection is made at an intermediate position between the hydraulic damper D and the actuator A as heavy objects, but both can be rendered integral with each other by the assembling work performed from only the upper side in FIG. 1 which side is opposite to the hydraulic damper. Consequently, the work of connecting the hydraulic damper D and the actuator A becomes easier and the worker's burden is lightened to a great extent.

As described above, since the connecting shaft 32 is inserted into the screw shaft 1 and is connected to the screw shaft 1 from the upper end side in FIG. 1 of the screw shaft 1, the connecting shaft 32 is set long, behaves itself as a spring element in a longitudinal direction for the screw shaft 1 which moves vertically in FIG. 1, and it is thereby possible to suppress shaft breakage and loosening of the nut 36.

In this case, since the screw shaft 1 and the connecting shaft 32 are threadably connected detachably, when replacement of only the hydraulic damper D or only the motion transforming mechanism T is needed in the construction of the suspension device S, it is possible to effect the replacement easily. It is also possible to make disassembly and check only a defective portion. Thus, since the screw shaft 1 and the connecting shaft 32 are connected together detachably, maintenance of the suspension device S becomes easier and so does the replacement of parts. But basically, the screw shaft 1 and the connecting shaft 32 can be connected together fixedly for example by welding or brazing. In this case, there is provided no merit in point of maintenance and replacement of parts, but the assembly of both hydraulic damper D and actuator A is facilitated as is the case with the detachable connection of both screw shaft 1 and connecting shaft 32. That is, the connection of both screw shaft 1 and connecting shaft 32 involves not only the detachable connection but also a fixed connection with detaching not intended. The detachable connection may be effected using any other means than the screw clamping.

In the above description, in order to facilitate the work of connecting the hydraulic damper D and the actuator A integrally with each other in the suspension device S, the screw shaft 1 is made tubular and the connecting shaft 1 is made connectable to the screw shaft 1 from the upper end in FIG. 1 corresponding to the side opposite to the hydraulic damper in the screw shaft 1. However, without making the screw shaft 1 tubular, the screw shaft 1 may be connected directly to the rod 31 or the cylinder 30 of the hydraulic damper D at an intermediate position between the hydraulic damper D and the actuator A.

The air piston 37 which covers the cylinder 30 is provided on an outer periphery of a side portion of the cylinder 30 in the hydraulic damper D and an air piston cap 38 provided on its outer periphery with an annular stopper 38a is threadably engaged with an upper end of the air piston 37. The air piston cap 38 is provided on its inner periphery with a flange 38b.

A lower end of the spacer 44 fixed to the air piston 37 is bent inwards to form a horizontal portion 44a, and with the horizontal portion 44a, an upward movement in FIG. 1 of a spring seat 45 fitted in the inner periphery of the air piston 37 is inhibited.

Moreover, a spring 39a is interposed between a lower end of the air chamber 37 and the spring seat 35 provided on the outer periphery of the disc 33, and a spring 39b is interposed between the spring seat 45 fitted in the inner periphery of the upper end of the air piston 37 and the spring seat 34 provided on the outer periphery of the disc 33. With the springs 39a and 39b, the piston is urged so that the piston position (not shown) relative to the cylinder 30 is maintained at a neutral position.

Since the springs 39a and 39b function to restore the piston position to the neutral position, it is possible to avoid the occurrence of an accident such that the hydraulic damper D remains extended maximum or retracted maximum, with consequent interference of the piston with the upper or lower end of the cylinder 30 and inability to absorb a high-frequency vibration, or deterioration of ride comfort in the vehicle. Thus, the reliability of the suspension device S can be improved.

By the neutral position is meant a position in which with the suspension device S interposed between the sprung member and the unsprung member in the vehicle, there is made positioning of the piston connected to the rod 31 with respect to the cylinder 30. It does not always indicate only the center of the cylinder 30.

The biasing force of the springs 39a and 39b and the neutral position of the piston can be adjusted by adjusting the vertical length of the spacer 44 to change the position of the spring seat 45. In this point, there is a significance of providing the spacer 44.

An annular cushion 42 is fitted in an inner periphery of an air chamber 22 to be described later so as to confront the upper end of the air piston 37 and its upward movement is inhibited by a lower end of the holder 5. Upon maximum retraction of the suspension device S, the cushion 42 comes into abutment against the air piston cap 38 provided at the upper end of the air piston 37 to inhibit a further retraction and cushion the shock created upon the maximum retraction. That is, the cushion 42 and the air piston 37 restrict the maximum retraction stroke length of the suspension device S.

The actuator A constructed as above is connected to the sprung member through a mount 23 which is clamped to the flange 11b of the casing 11 of the motor M with the bolt 21. The mount 23 includes an annular lower plate 24 fixed to an outer periphery of the upper end of the holder 5, an annular upper plate 25 capable of being attached to the sprung member (not shown), and vibration isolating rubber 26 interposed between the lower plate 24 and the upper plate 25.

To the outer periphery of the holder 5 is connected a tubular air chamber 22 which forms a chamber portion of the air spring AS disposed on the outer periphery side of the actuator A. A tubular flexible diaphragm 27 is mounted bridgewise between a lower end of the air chamber 22 and an outer periphery of an intermediate portion of the air piston 37, and a tubular diaphragm cover 28 is attached to an outer periphery of the lower end of the air chamber 22 to cover the diaphragm 27 and inhibit an outward expansion of the diaphragm 27.

In the suspension device S, a gas chamber 29 is formed by the air chamber 22, diaphragm 27, air piston 37, hydraulic damper D and motor M. Upon extension or retraction of the suspension device S, the air piston 37 gets into or out of the air chamber 22, with a consequent change in volume and pressure of the gas chamber 29, affording a function as the air spring AS. In the case of this embodiment, the air piston 37 functions as an air piston and the air spring AS is constituted by partitioning the gas chamber 29 with air chamber 22, diaphragm 27, air piston 37, hydraulic damper D and motor M.

As described above, the partition wall 14 is provided in the motor M and the interior of the partition wall 14 functions as a part of the gas chamber 29. The motion transforming mechanism T is accommodated within the gas chamber 29 which is isolated from the exterior. Thus, the motion transforming mechanism T is not subject to interference of water and dust. In the presence of the partition wall 14, the stator 12 of the motor M and the resolver stator 20 are disposed outside the gas chamber 29, so that it is possible to avoid introduction of a power supply wiring which is difficult to be sealed in an airtight manner into the gas chamber 29.

Moreover, since an upper end side of the cylinder 30 and the rod 31 in the hydraulic damper D can be accommodated within the gas chamber 29, it is also possible to prevent interference of water and dust with the sliding portion between the upper end side of the cylinder 30 and the rod 31.

In the air spring AS thus constructed, the air chamber 22 is connected to the motor M of the actuator A and the air piston 37 adapted to move relatively with respect to the air chamber 22 is connected through the hydraulic damper D to the screw shaft 1 as a linear motion member in the actuator A, so that the air spring AS functions as a suspension spring interposed between the sprung member and the unsprung member of the vehicle and supports the sprung member resiliently.

Connection between the motor M and the air chamber 22, as well as connection between the air piston 37 and the screw shaft 1 as a linear motion member, may be done indirectly through a certain member. By the connection as referred to herein is meant to include not only a direct connection but also an indirect connection through a certain member. Therefore, as in this embodiment, the mount 23 may be interposed between the motor M and the air chamber 22 in connecting the two and the hydraulic damper D may be interposed between the air piston 37 and the linear motion member in connecting the two.

With the hydraulic damper D and the actuator A connected in series with each other, as noted above, both extend and retract each independently. Therefore, if there is no restriction, an overall maximum extension stroke length of the suspension device S becomes the sum of both the maximum extension stroke length of the hydraulic damper D and that of the actuator A. Thus, it is necessary to restrict the entire maximum extension length of the suspension device S.

In view of this point, as noted above, the suspension device S is provided with a stopper seat 46 projecting inwards from an inner periphery of an intermediate portion of the air chamber 22 and a stopper 38a fixed to the upper end of the air piston 37. The stopper 38a and the stopper seat 46 are disposed so as to confront each other vertically. As the suspension device S extends, the stopper 38a and the stopper seat 46 approach each other, and eventually come into mutual abutment to inhibit a further extension of the suspension device S, that is, inhibit a relative separation between the air chamber 22 and the air piston 37.

The stopper seat 46 is composed of an annular cushion seat 47 attached to the inner periphery of the air chamber 22 and an annular cushion 48 fitted in the inner periphery of the air chamber 22, a downward movement in FIG. 1 of the cushion 48 being inhibited by the cushion seat 47. The cushion 48, upon abutment thereof against the stopper 38a, is compressed to cushion the resulting abutment shock.

Thus, in the suspension device S according to the present invention, the stopper 38a is provided on the outer periphery of the air piston 37 and the stopper seat 46 which comes into abutment against the stopper 38a upon maximum extension of the suspension device is provided on the inner periphery of the air chamber 22. Therefore, unlike the prior art, it is not necessary to install on the motor side a tubular member provided with a member for abutment against the stopper, that is, the weight of the suspension device S can be so much reduced. Moreover, in connection with restriction of the maximum extension length, since the installation of a tubular member is not needed, it is not necessary to ensure a clearance for installation of a tubular member, whereby the outside diameter of the suspension device can be reduced.

Although the air piston cap 38 is utilized for providing the stopper 38a in the air piston 37, no limitation is made thereto. There may be adopted any other method, for example, bending the opening end of the air piston 37 outwards to form a stopper.

Further, although the use of the cushion 48 as the stopper seat 46 is advantageous in that the shock can be cushioned upon maximum extension of the suspension device S, the construction of the stopper seat 46 is not limited thereto insofar as the stopper seat adopted can be abutted against the stopper 38a. For example, the air chamber 22 may be formed with an annular flange projecting to the inner periphery side by caulking or pressing and the annular flange thus formed may be used as the stopper seat.

An embodiment of the present invention is as described above, but it goes without saying that the scope of the present invention is not limited to the very details illustrated in the drawing or explained above.

INDUSTRIAL APPLICABILITY

The suspension device of the present invention is applicable to a vehicular suspension.

The invention claimed is:

1. A suspension device comprising:
a motion transforming mechanism for transforming a linear motion of a linear motion member into a rotational motion of a rotating member;
a disc connected to said linear motion member;
a first spring;
a second spring;
a motor connected to the rotating member in the motion transforming mechanism;
an air spring, the air spring including a tubular air chamber connected to the motor, an air piston connected to the linear motion member, and a diaphragm interposed between the air chamber, the motor and the air piston, said tubular air chamber comprising a gas chamber, said air piston being tubular and having a diameter that is smaller than said air chamber;
a first spring seat connected to said disc, said first spring being arranged between a lower end portion of said air piston and said first spring seat;
a second spring seat connected to an inner surface of an upper end portion of said air piston;
a third spring seat connected to said disc, said second spring being arranged between said second spring seat and said third spring seat;
a stopper provided on an outer periphery of the air piston; and
a stopper seat provided on an inner periphery of the air chamber so as to be put in abutment against said stopper upon maximum extension of the suspension device involving relative separation of the air chamber and the air piston with respect to each other.

2. The suspension device according to claim 1, wherein the air piston is connected to the linear motion member through a hydraulic damper connected to the linear motion member.

3. The suspension device according to claim 2, wherein one of a rod and a cylinder of the hydraulic damper is connected to the linear motion member and the other is connected to the air piston.

4. The suspension device according to claim 1, wherein said stopper element and said stopper seat element are perpendicular to a longitudinal axis of said air piston.

5. The suspension device according to claim 1, wherein at least a portion of said disc is arranged between said first spring seat and said third spring seat, said third spring seat being opposite said first spring seat, said first spring seat, said second spring seat and said third spring seat having a portion perpendicular to said linear motion member, said first spring comprising a first spring first end portion and a first spring second end portion, said first spring first end portion engaging a portion of said first spring seat, said first spring second end portion located adjacent to a portion of said air piston, said second spring comprising a second spring first end portion and a second spring second end portion, said second spring first end portion engaging a portion of said third spring seat, said second spring second end portion engaging a portion of said second spring seat, wherein said second spring is arranged at a position above said first spring.

6. The suspension device according to claim 5, further comprising:
a bump cushion engaging said third spring seat.

7. A suspension device comprising:
a linear motion member;
a disc connected to said linear motion member;
a first spring seat engaging said disc, said first spring seat being arranged on one side of said disc;
a second spring seat engaging said disc, said second seat being arranged on another side of said disc;
a first spring having one end engaging said first spring seat;
a second spring having one end engaging said second spring seat;
a motion transforming mechanism;
a rotating member in the motion transforming mechanism, said motion transforming mechanism transforming a linear motion of said linear motion member into a rotational motion of said rotating member;
a motor connected to said rotating member;

an air spring comprising an outer element, a tubular air piston connected to said linear motion member and a diaphragm arranged between the air chamber, said motor and said air piston, said outer element defining at least a portion of a gas chamber, said air piston having a diameter that is less than a diameter of said outer element, said air spring being operatively connected to said motor;

a stopper element provided on an outer peripheral surface of said air piston; and a stopper seat element provided on an inner surface of said outer element, said stopper seat engaging said stopper element with said air piston in a maximum extension position.

8. The suspension device according to claim 7, wherein the air piston is connected to the linear motion member through a hydraulic damper connected to the linear motion member.

9. The suspension device according to claim 8, wherein one of a rod and a cylinder of the hydraulic damper is connected to the linear motion member and the other of said rod and said cylinder of the hydraulic damper is connected to the air piston.

10. The suspension device according to claim 7, wherein said stopper element and said stopper seat element are perpendicular to a longitudinal axis of said air piston.

11. The suspension device according to claim 7, further comprising:

a third spring seat engaging an inner surface of said air piston, said first spring seat, said second spring seat and said third spring seat having a portion perpendicular to said linear motion member, at least a portion of said disc being arranged between said first spring seat and said second spring seat, said first spring having another first spring end portion, said another first spring end portion engaging a portion of said third spring seat, said second spring comprising another second spring end portion, said another second spring end portion being located adjacent to an end portion of said air piston.

12. The suspension device according to claim 11, further comprising:

a bump cushion engaging said first spring seat.

13. A suspension device comprising:

a linear motion member;

a disc connected to said linear motion member;

a first spring seat, at least a portion of said first spring seat being perpendicular to said linear motion member, said at least said portion of said first spring seat comprising a first spring seat first surface and a first spring seat second surface, said first spring seat first surface being opposite said first spring seat second surface, said first spring seat first surface engaging said disc, said first spring seat being located on one side of said disc;

a first spring having a first spring first end portion in contact with a portion of said first spring seat second surface;

a second spring seat, at least a portion of said second spring seat being perpendicular to said linear motion member, said at least said portion of said second spring seat comprising a second spring seat first surface and a second spring seat second surface, said second spring seat first surface being opposite said second spring seat second surface, said second spring first surface engaging said disc, said second spring seat being located on another side of said disc;

a second spring having a second spring first end portion in contact with a portion of said second spring seat second surface;

a rotating member;

a motion transforming mechanism, said motion transforming mechanism transforming a linear motion of said linear motion member into a rotational motion of said rotating member;

a motor connected to said rotating member;

an air spring comprising an outer element, said outer element being connected to said motor, a tubular air piston connected to said linear motion member and a diaphragm arranged between the air chamber, said motor and said air piston, said outer element defining at least a portion of a gas chamber, said air piston having a diameter that is less than a diameter of said outer element, wherein said air piston is movable based at least on actuation of said motor;

a stopper element provided on an outer peripheral surface of said air piston; and a stopper seat element provided on an inner surface of said outer element, said stopper seat engaging said stopper element with said air piston in a maximum extension position.

14. The suspension device according to claim 13, wherein the air piston is connected to the linear motion member through a hydraulic damper connected to the linear motion member.

15. The suspension device according to claim 14, wherein one of a rod and a cylinder of the hydraulic damper is connected to the linear motion member and the other of said rod and said cylinder of the hydraulic damper is connected to the air piston.

16. The suspension device according to claim 14, wherein said stopper element and said stopper seat element are perpendicular to a longitudinal axis of said air piston.

17. The suspension device according to claim 13, further comprising:

a bump cushion engaging said first spring seat and said disc.

* * * * *